March 19, 1946.                L. S. PFOST                2,397,042
                             HYDRAULIC LIFT
                          Filed May 6, 1944            6 Sheets-Sheet 1
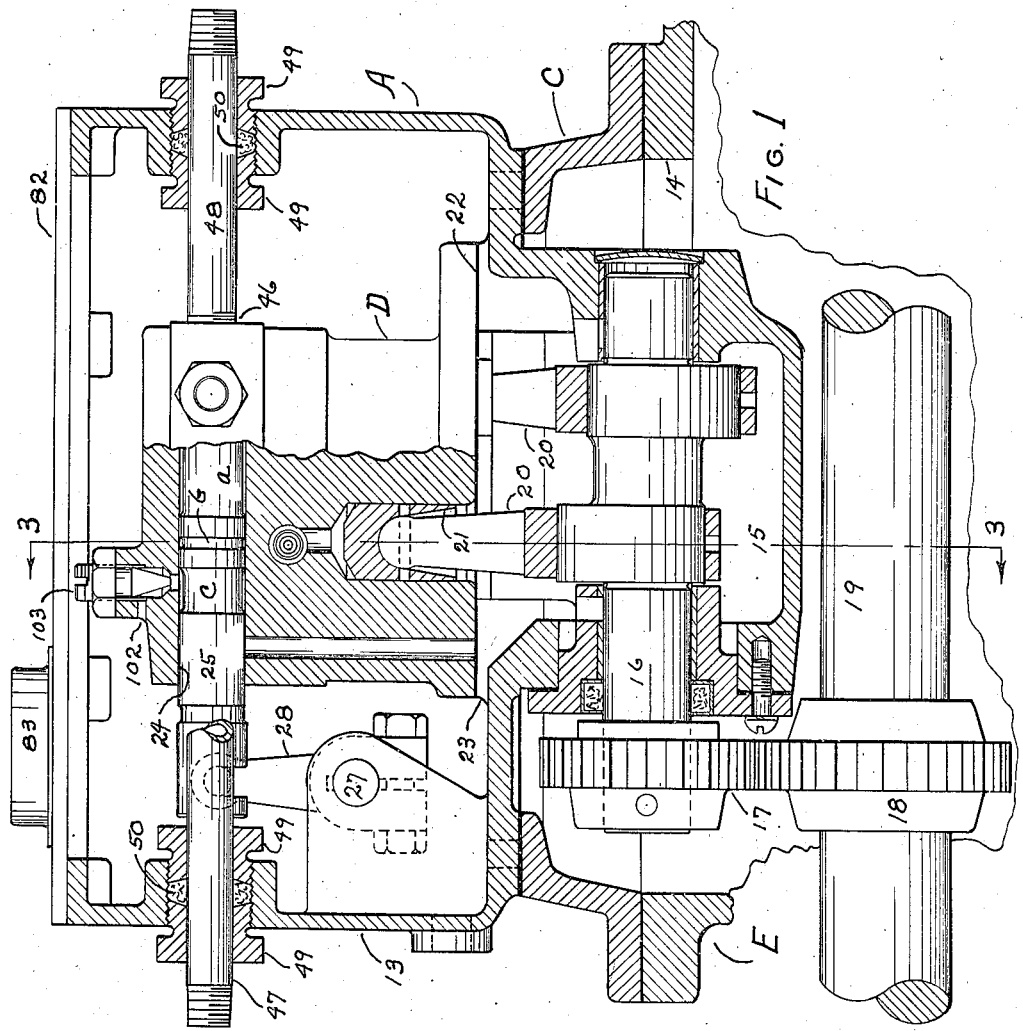
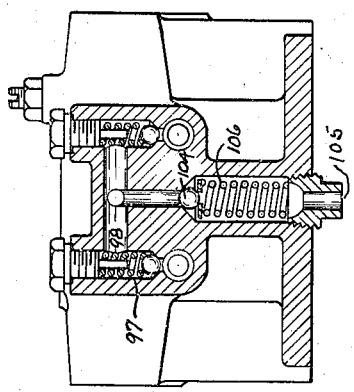
INVENTOR.
LESTER S. PFOST
BY a.S.Krob
ATTORNEY

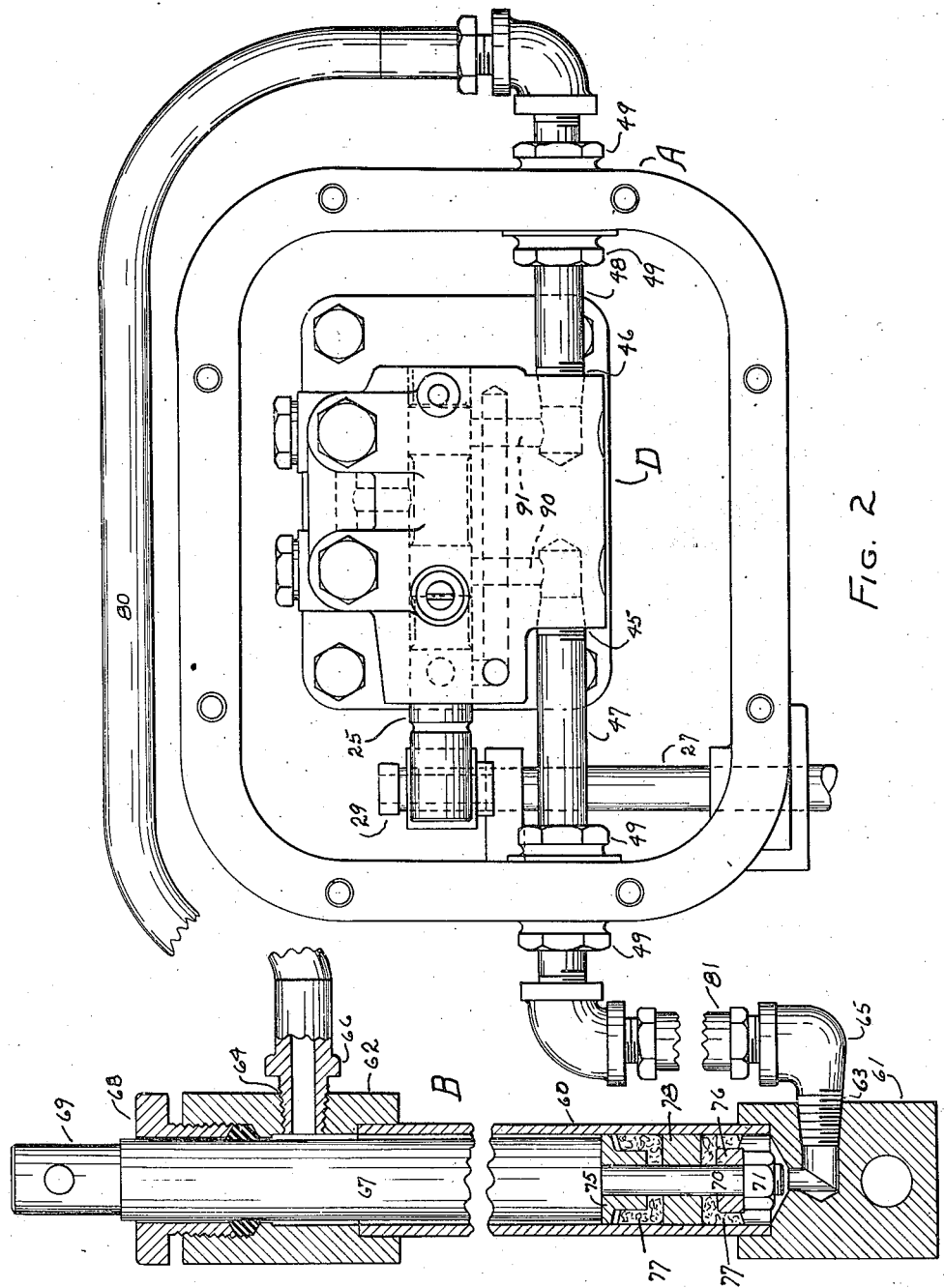

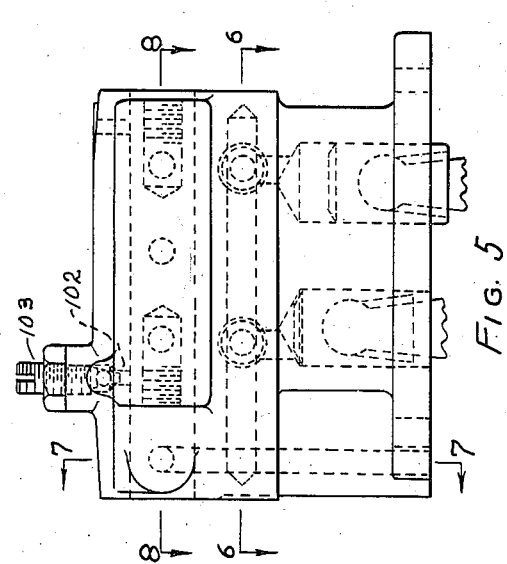
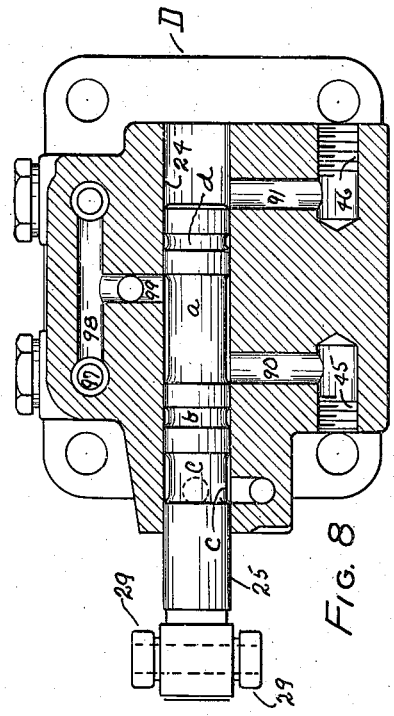
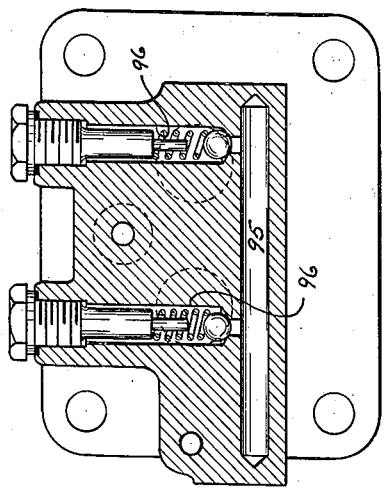
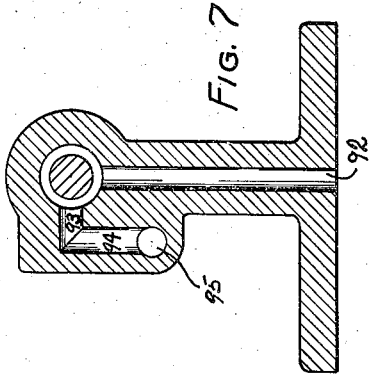
INVENTOR.
LESTER S. PFOST
BY
ATTORNEY

March 19, 1946. L. S. PFOST 2,397,042
HYDRAULIC LIFT
Filed May 6, 1944 6 Sheets-Sheet 5
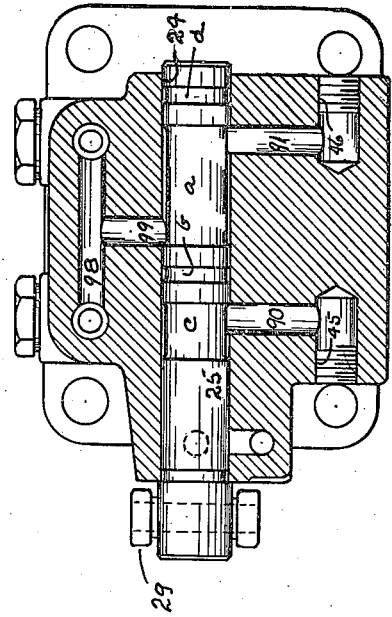
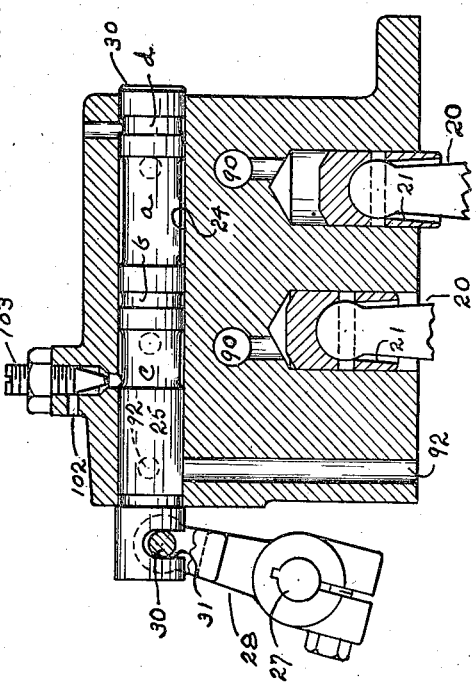
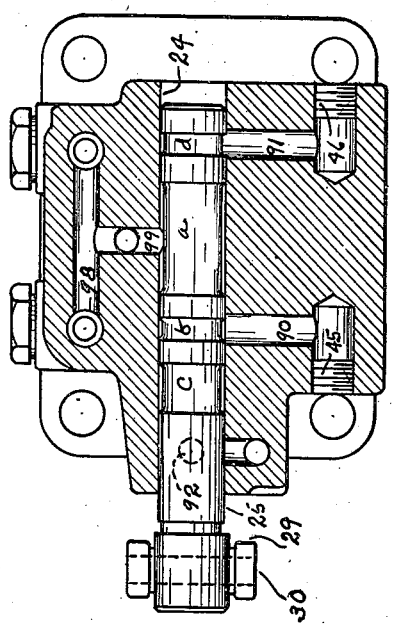
INVENTOR.
LESTER S. PFOST
BY
ATTORNEY March 19, 1946.

L. S. PFOST 2,397,042

HYDRAULIC LIFT

Filed May 6, 1944

INVENTOR.
LESTER S. PFOST
BY
ATTORNEY

Patented Mar. 19, 1946

2,397,042

UNITED STATES PATENT OFFICE 2,397,042

HYDRAULIC LIFT

Lester S. Pfost, Racine, Wis., assignor to The Massey-Harris Company, Racine, Wis., a company of Maryland Application May 6, 1944, Serial No. 534,513

4 Claims. (Cl. 60—52)

The present invention relates to hydraulic lifts particularly adapted for tractors and raising and lowering implements and other devices adapted to be drawn or carried by the tractor.

The present invention relates to a novel pump and valve unit adapted to be driven by the power take-off shaft or some other operating shaft on the tractor. The device includes a housing which in addition to enclosing the pump and valve mechanism, answers as a supply tank and sump for the transmission oil.

The applicant's pump unit is complete and adapted to be attached to the housing of the tractor, preferably in a manner so a gear on the pump shaft meshes with a gear on the driver shaft and whereby the unit may be removed and reattached, the pump shaft and its gear extending into the tractor housing for the purpose.

In the applicant's invention the ram is adapted to be attached to the tractor in any position required for convenient connection to the implement or the part to be raised and lowered, the connections being made between the pump unit and the ram by means of suitable pipes, tubes or hose.

It will be understood that if desired applicant's ram may be connected directly to the pump mechanism forming a part thereof.

An object of the present invention is to provide a device wherein the pump unit and ram may be conveniently positioned on the tractor and wherein either unit may be conveniently attached and detached.

A further object of the present invention is to provide a valve which can be easily connected to a lever within easy reach of the operator and wherein by manipulating the lever the ram may be moved by oil pressure in either direction and held in any desired position.

A still further object of my invention, is to provide a device which is durable, self-lubricating and easily manufactured at low cost.

Another object of my invention is to provide a pump unit having a housing and ram which are compact and neat in appearance.

To these and other useful ends my invention consists of parts, combination of parts or their equivalents and mode of operation as herein described and claimed and shown in the accompanying drawings in which:

Figure 1 is a vertical section through line 1—1 of Figure 3.

Figure 2 is a top view of the pump with its lid removed, including a partially sectioned fractional view of the ram.

Figure 4 is a section taken on line 4—4 of Figure 3.

Figure 5 is a side view of the pump proper when removed from the housing.

Figure 6 is a horizontal section taken on line 6—6 of Figure 5.

Figure 7 is a section taken on line 7—7 of Figure 5 and shows path of oil from reservoir when valve is in raising or lowering position to be explained later.

Figure 8 is a horizontal section taken on line 8—8 of Figure 5 showing valve in raising position.

Figure 9 is another section similar to Figure 8 but with the valve in medial or neutral position.

Figure 10 is a section similar to Figure 8 but with the valve in lowering position.

Figure 11 is a vertical section taken on line 11—11 of Figure 3 with the valve in the same position as shown in Figure 10 (lowering position).

Figure 3:
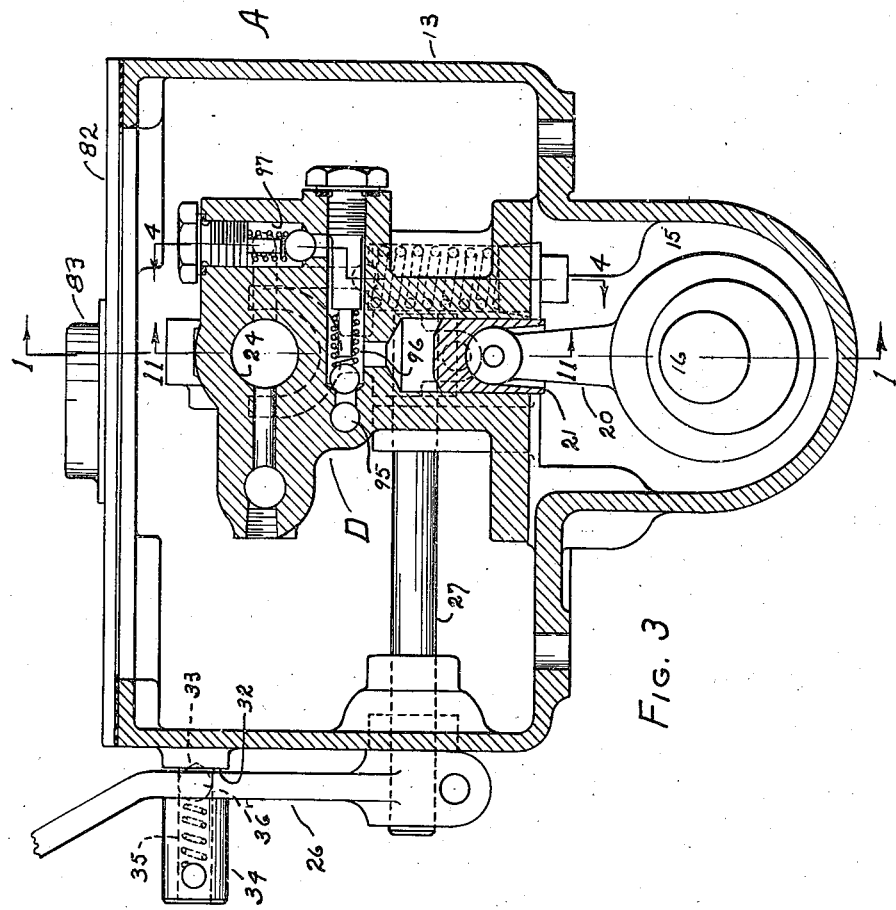
Figure 3 is a vertical transverse section taken on line 3—3 of Figure 1.

In the various figures the pump case in its entirety is designated by reference character A. The ram is designated in its entirety by reference character B. The adapter with which unit A is secured to the tractor housing is designated in its entirety by reference character C. The pump itself is designated in its entirety by reference character D.

Unit A comprises a housing 13 in which the pump D is positioned. Tractor E, preferably at its upper rear corner, is provided with an opening 14, member C being suitably secured to the housing E and surrounding the opening 14 as illustrated in Figure 1. Member A is provided with a well 15 and a pump shaft 16 is rotatably mounted on the portion of the housing A which forms the well as illustrated in Figure 1. This shaft is provided with a gear 17 which meshes with a gear 18 mounted on the power take-off shaft 19 of the tractor.

Thus it will be seen that units A and C may be conveniently removed from the tractor and that when the power take-off shaft is operating, gears 17 and 18 will be supplied with lubrication from the housing of the tractor, and that the pump shaft 16 and the connecting rod bearings and pistons will be lubricated by the oil in well 15, housing 13 acting as a sump for the return oil from the ram. Connecting rods 20—20 operatively connect crank shaft 16 and pistons 21.

The pump D is detachably secured on a seat 22 formed in housing 13.

Well 15 and the interior of pump housing 13 are interconnected by means of port 23. Thus chambers 15 and housing 13 act as an oil reservoir and sump. Member D may be considered a cylinder block having a longitudinal opening 24 at its top into which a valve 25 is snugly fitted. Valve 25 in Figures 10 and 11 is shown in its extreme right hand or lowering position. This valve in Figure 8 is a shown in its extreme lefthand or raising position and in Figure 9 the valve is shown in its medial (neutral) position.

The valve is operated by means of a hand lever 26 which is mounted on the protruding end of a shaft 27 having rigidly mounted thereon a lever 28 (see Figures 1 and 11) the upper end of the lever being forked as at 29. The forks are connected together by means of a small shaft 30 (see Figure 11) which extends freely through a slot 31 in the end of valve 25. Thus by moving lever 26 back and forth the valve simultaneously is moved back and forth into raising or lowering position for controlling the movement of the ram as will hereinafter appear. Lever 26 may be operated manually directly or by a remote control through a suitable connection. A surface 32 is provided which is on a radius with shaft 27 having depression 33, the lever having a member 34 and the lever and member 34 being provided with an opening for the reception of a spring 35 and a steel ball 36 so the ball will be forced against surface 32 and into depression 33 at which time the valve is in neutral or medial position. Since all of the oil moving to and returning from the ram B is controlled by the valve, certain ports are provided for connections to the pump as follows:

Inlet and outlet openings 45 and 46 are screw-threaded for reception of pipes 47 and 48, the pipes extending through the walls of member 13 as clearly illustrated in Figure 1 by means of stuffing box members 49 having suitable packing therebetween as at 50 see Figure 1. Thus convenient means are provided with which to connect ram B to the pump.

Member B comprises a cylinder 60 having a head 61 at one end and another head 62 at the other end each being screw-threaded similarly as at 63 and 64 suitable for fittings 65 and 66 forming connections into opposite ends of the cylinder. A piston rod 67 protrudes through a packing gland 68 and having at its outer end suitable means 69 for connection to the implement or part to be lifted or operated. Piston rod 67 is provided with a piston head through which a stem 70 extends and having a nut 71 with which to bind the piston head to the piston rod. Any suitably designed head may be used, I prefer however the design shown in Figure 2 wherein a flanged collar 75 and a front collar 76 hold cup leathers 77—77 against central collar 78.

It will be noted that piston rod 67 is very little smaller than cylinder 60. Clearly therefore the power exerted by the piston in one direction is very much less than the power exerted in the other direction.

In tractor lifts great power is required to lift the implement, the implement will however return downwardly by gravity. My ram is designed to supply abundant power for lifting the implement and sufficient power for returning the ram to the position shown in Figure 2.

The connections from head 61 are made to pipe 47 in any suitable manner and the connections from head 62 are made to pipe 48 in any suitable manner. In Figure 2 I show a pipe 80 for one of these connections and a pipe 81 for the other.

It will be noted by observing Figures 1, 2 and 3 that member 13 is open at the top and the opening is closed by means of a lid 82. The lid is suitably gasketted and secured to the housing and is preferably provided with a filler cap 83.

It will be understood that Figures 8, 9, and 10 illustrate the three positions of valve 25; that when the valve is in a medial position (see Figure 9) the ram will be held stationary because its connections to the pump are closed. As later explained the ram may be caused to move in either direction by moving the valve.

Figure 12:
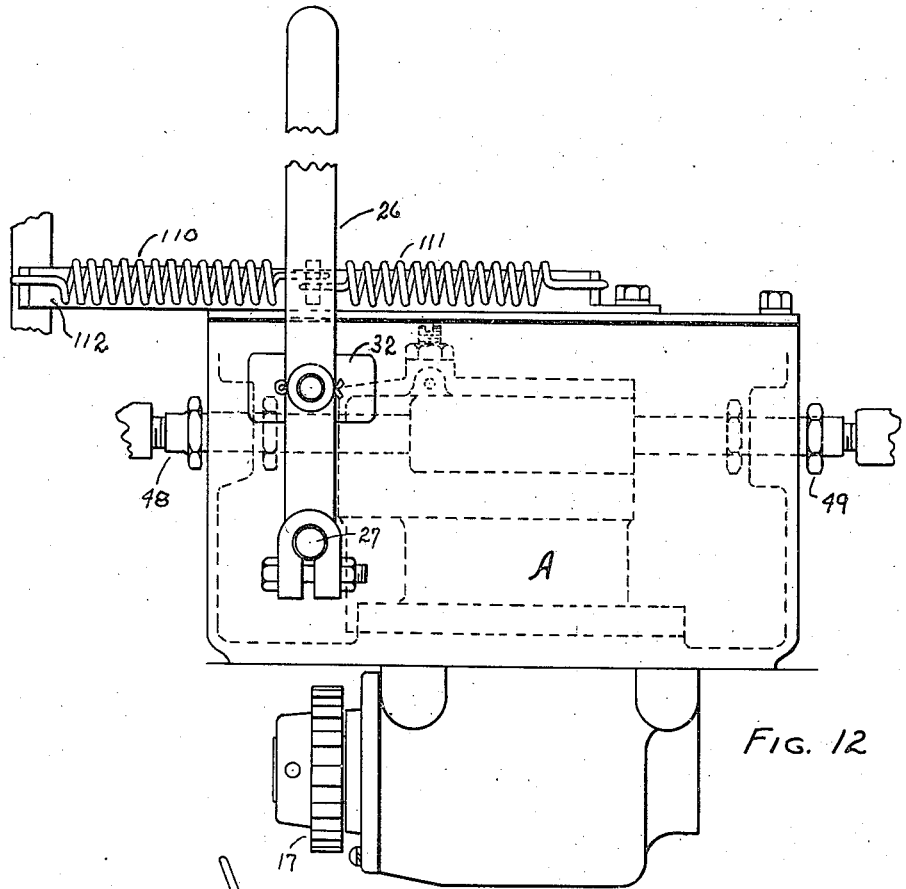
Figure 12 is a side view of the pump housing showing the location of the lever return springs.

The operator moves lever 26 from neutral position forwardly or rearwardly in order to put into motion the ram. The movement of lever 26 and the valve 25 are simultaneous as previously explained. When the lever is moved rearwardly, the valve moves into the raising position as shown in Figure 8. Whenever the operator releases lever 26, whether in raising or lowering position, it is returned to neutral by springs 110 and 111. The springs are held in place by bracket 112 and lever 26 to which they are fastened as shown in Figure 12, the ram plunger 69 remaining in its acquired position. Therefore let it be understood that the operator can control the extent of travel of the ram plunger 69, thus controlling the extent of work of the mechanism.

The pistons 21—21 are constantly in motion whether the ram is operated or not. A downward motion of piston 21 (see Figure 3) draws oil from the reservoir of the sump through holes 92, 93, 94 and 95 (see Figures 6 and 7) and through a ball valve in hole 96 (see Figures 3 and 6). The upward motion of the piston closes the ball valve in hole 96 and forces oil through a ball valve to the hole 97 then through holes 98 and 99 (see Figures 8 and 4). Oil is forced from hole 99 through recess $a$ in the valve then to port 90, to 45 and out through pipe 47 (see Figure 2) into hose 81 and to the piston chamber, forcing the plunger to raise the implement upward. This action automatically forces oil already in the other end of the ram out through hose 80, through pipe 48 and enters pump body D at hole 46. Oil travels from hole 46 (see Figure 8) through 91, past the valve and out of pump body D and into the sump.

When the ram reaches the desired position the operator releases lever 26 (as previously explained) and the valve is moved into neutral position as shown in Figure 12 by the springs. When valve 25 is in neutral or holding position holes 90 and 91 are blocked, therefore no oil can return to the pump from the ram (see Figure 9). This is so even if the ram plunger is in either raised or lowered position. As stated before the pistons continue motion but since oil supply hole 92 is closed off (see Figures 9 and 11) and the recess $a$ in the valve where the oil is forced through from hole 99 when the valve is in either position (Figures 10 and 8) other than neutral, is also closed, there is no flow of oil as both the intake hole and outlet holes are closed.

Figure 10 shows the valve in lowering position which is accomplished by moving lever 26 forward. The action of oil in the pump is the same as when the valve is in raising position up to hole 99 (see Figures 3 and 10). When oil reaches hole 99 the valve is set so that recess $a$ in the valve directs the oil to hole 91, through 46 out of pump body D (see Figure 2) through pipe 48, through connections and hose 80 to the ram 64. The plunger is then forced to return to the position shown in Figure 2, the lowered position. The oil that is in the ram under the piston head is forced back through hose 81 to pump body D entering through pipe 47 to hole 45, through 90 (see Figure 10) through a recess c in the valve and out hole 102 to the sump (see Figures 1 and 11). Screw 103 (see Figure 1) can be adjusted so as to control the speed at which the oil returning from the ram is forced into the sump through hole 102, thus controlling the speed at which the ram is returned to the position shown in Figure 2.

The pump is provided with a relief valve 104 (see Figure 4). If pressure is too great this valve is forced open releasing pressure through hole 105, the oil returning to the sump. The amount of pressure required to open the valve is controlled by the strength of spring 106.

Thus it will be seen that the ram can be moved to any desired position by manipulating lever 26. When the ram is in the position desired and the lever is returned to its neutral position either by the springs or manually, the ram will be stationary and will remain so until the lever is again moved. The direction the lever is moved will determine the direction the ram moves. By scrutinizing Figure 13, it will be seen that lever 26 is within easy reach of the operator. I provide rearwardly extending supporting brackets 120 which are at their forward ends attached to the axle housing of the tractor as at 121. A shaft 122 is rotatably mounted on the rear ends of brackets 120. A lever 123 is secured to this shaft and member 69' of ram B is secured to the free end of this lever. Member 61 of ram B is hingedly mounted to the axle as shown. Member 69' is shown as being considerably longer than member 69 in Figure 2 to accommodate the position of lever 123. Secured to shaft 122 is a rearwardly extending arm 124, the free end of which may be attached to the implement or part to be lifted or controlled.

Figure 13:
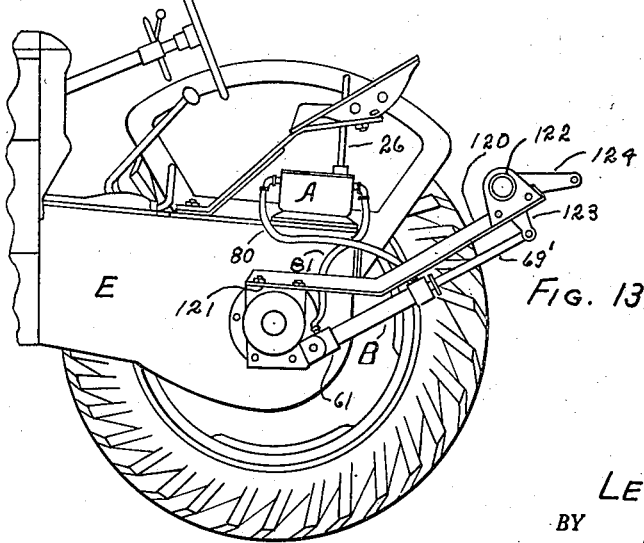
Figure 13 illustrates the rear end of a conventional tractor equipped with my invention.

Clearly ram B may be mounted on the forward end of the tractor and the pump remain in the position shown in Figure 13 or vice versa and other minor detail changes can be made from that shown in the drawings without departing from the spirit and scope of the invention as recited in the claims. For example: the ram piston may fit snugly into the ram cylinder thus dispensing with member 80 and its connections, ports and the oil return openings, so the ram will operate on the single stroke principle, wherein the weight of the implement will be depended upon to return the ram to its lowered position.

Having thus shown and described my invention, I claim:

1. A device of the character described comprising a tractor having a main housing and an operating shaft therein, an opening in said housing adjacent the shaft and a gear on the shaft adjacent the opening, another housing adapted to be detachably secured to said main housing and cover said opening, said last housing having a well which extends into said opening and having a shaft rotatably mounted therein with one end protruding through from the well and having a gear on the protruding end adapted to mesh the gear on said first shaft, a pump mounted in said other housing having an operating connection to said last shaft, a valve mechanism forming an integral part of said pump, the pump and valve mechanism being entirely within the other housing, a manually operated lever on the exterior of the other housing having an operating connection to said valve mechanism, a hydraulic double acting ram having two tube connections which extend through the walls of said other housing and being operatively connected to said valve mechanism, the ports associated with said valve mechanism and pump arranged whereby when said lever is moved in one direction the ram will be moved in one direction by oil pressure from the pump and the oil from the other end of the ram will be caused to flow into the pump housing as a sump, and when the lever is moved in the other direction the ram will be caused to move in the other direction and the oil from the other end of the ram will be caused to flow into the sump.

2. A device as recited in claim 1 characterized by; said ram connections having stuffing boxes where they pass through the walls of said other housing to thereby seal the joint and provide yielding means between the valve mechanism and other housing.

3. A device of the character described comprising a tractor having a main housing and an operating shaft therein, an opening in said main housing adjacent the shaft and a gear on the shaft adjacent the opening, an adapter adapted to be detachably secured about said opening, another housing secured to said adapter, said last housing having a well which extends into said opening and having a shaft rotatably mounted therein with one shaft end protruding from the well and having a gear on the protruding end adapted to mesh the gear on said operating shaft, a pump mounted in said other housing having an operating connection to said last shaft, a valve mechanism forming an integral part of said pump, the pump and valve mechanism being entirely within said other housing, a manually operated lever on the exterior of the other housing having an operating connection to said valve mechanism, a hydraulic ram having operating connections which extend through the wall of said other housing and into the pump, ports associated with said valve mechanism and pump arranged whereby when said lever is moved in one direction the ram will be moved toward a lifting position by oil pressure from the pump and when the lever is moved in the other direction the oil from the ram will be permitted to flow back into the well and the ram permitted to return to its lowered position.

4. A device of the character described comprising; a tractor having a main housing and an operating shaft therein, an opening in said housing adjacent the shaft and a gear on the shaft adjacent the opening, another housing adapted to be detachably secured to said main housing and cover the opening, said last housing having a well which extends into said opening and having a shaft rotatably mounted therein with one end protruding through the wall of the well and having a gear mounted on the protruding end adapted to mesh the gear on said first shaft, a pump mounted in said other housing and having an operating connection to said last shaft, said other housing being removably secured to the first housing, an adapter forming the bottom of said other housing and being detachably secured thereto.

LESTER S. PFOST.